US009582249B2

(12) United States Patent
Boehl

(10) Patent No.: US 9,582,249 B2
(45) Date of Patent: Feb. 28, 2017

(54) METHOD FOR MONITORING THE OUTPUT OF A RANDOM GENERATOR

(71) Applicant: Robert Bosch GmbH, Stuttgart (DE)

(72) Inventor: Eberhard Boehl, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 483 days.

(21) Appl. No.: 13/918,608

(22) Filed: Jun. 14, 2013

(65) Prior Publication Data

US 2013/0346458 A1    Dec. 26, 2013

(30) Foreign Application Priority Data

Jun. 20, 2012  (DE) .................. 10 2012 210 361

(51) Int. Cl.
*G06F 7/58* (2006.01)
(52) U.S. Cl.
CPC ................... *G06F 7/588* (2013.01)
(58) Field of Classification Search
None
See application file for complete search history.

(56) References Cited

U.S. PATENT DOCUMENTS

2004/0205095 A1* 10/2004 Gressel et al. ................ 708/253
2005/0231294 A1* 10/2005 Luzzi .............................. 331/78
2007/0244950 A1* 10/2007 Golic ............................ 708/250

FOREIGN PATENT DOCUMENTS

EP     1686458     2/2006

OTHER PUBLICATIONS

Bock, Holger et al., "An Offset-compensated Oscillator-based Random Bit Source for Security Applications", CHES 2004, LNCS 3156 pp. 268-281, 2004.
Sunar, B. et al., "A provably Secure True Random Number Generator with Built-in Tolerance to Active Attacks", IEEE Transations on Computers, vol. 56, No. 1, Jan. 2007.

* cited by examiner

*Primary Examiner* — Michael D Yaary
(74) *Attorney, Agent, or Firm* — Norton Rose Fulbright US LLP

(57) ABSTRACT

An assemblage for monitoring an output of a random generator is provided, which assemblage compares chronologically successive sample values at a sampling point with one another in order to detect a relationship of the compared sample values with one another.

13 Claims, 5 Drawing Sheets

METHOD FOR MONITORING THE OUTPUT OF A RANDOM GENERATOR

BACKGROUND OF THE INVENTION

1. Field of the Invention

The invention relates to a method and an assemblage for monitoring an output of a random generator.

2. Description of the Related Art

Random numbers, which are referred to as the outcome of random elements, are required for many applications. So-called "random generators" are used to generate random numbers. Random generators are methods that supply a sequence of random numbers. A crucial criterion for random numbers is whether the outcome of the generation can be regarded as independent of previous outcomes.

Random numbers are required, for example, for cryptographic methods. These random numbers are used, for example, to generate keys for encoding methods. Such keys are subject to stringent requirements in terms of randomness properties. Pseudo-random number generators (PRNGs), represented e.g. by a linear feedback shift register (LFRS), are therefore not suitable for this purpose. Only a true random number generator (TRNG) meets the applicable requirements. These utilize natural noise processes in order to obtain an unpredictable outcome. Noise generators that utilize the thermal noise of resistors or semiconductors, or the shot noise at potential barriers, for example at p-n transitions, are usual. A further possibility is to utilize the radioactive decay of isotopes.

While the "classic" methods use analog elements, such as e.g. resistors, as noise sources, digital elements such as, for example, inverters, have often been used in the recent past. These have the advantage of lesser complexity in terms of circuit layout, since they are available as standard elements.

It is known, for example, to use ring oscillators, which represent an electronic oscillator circuit. With these, an odd number of inverters is interconnected into a ring, producing an oscillation having a natural frequency. The natural frequency depends on: the number of inverters in the ring; the properties of the inverters; the interconnection conditions, i.e. lead capacitances; the operating voltage; and the temperature. The noise of the inverters results in a random phase shift with respect to the ideal oscillator frequency, which is used as a random process for the TRNG. It is noteworthy that ring oscillators oscillate independently, and do not require external components such as, for example, capacitors or coils.

One problem in terms of the utilization of randomness occurs because the ring oscillator must be sampled as close as possible to an expected ideal edge so that a random sample value is obtained. The publication of Bock, H., Bucci, M., Luzzi, R.: An Offset-Compensated Oscillator-Based Random Bit Source for Security Applications, CHES 2005, indicates a possibility for always sampling in the vicinity of an oscillator edge, by controlled shifting of the sampling point in time.

Published European patent document EP 1 686 458 B1 discloses a method for generating random numbers with the aid of a ring oscillator, in which a first and a second signal are made available, the first signal being sampled in a manner triggered by the second signal. In the method described, a ring oscillator is repeatedly sampled, in which context only non-inverting delays, i.e. an even number of inverters as delay elements, are always used. The oscillator ring is always sampled, simultaneously or with a mutual delay, after an even number of inverters beginning from a starting point. Shifting of the sampling time can thereby be omitted; instead, the repeatedly sampled signals are evaluated.

A further possibility involves the use of multiple ring oscillators, as explained, e.g., in the publication Sunar, B. et al.: "A Provable Secure True Random Number Generator with Built In Tolerance to Active Attacks," IEEE Trans. on Computers, January 2007. Here multiple sample values from different ring oscillators are combined with one another and evaluated. A good random value can be achieved in this manner if the corresponding prerequisites in terms of implementation are met. Unfortunately the necessary XOR instruction cannot operate at the required high frequency, and because of substrate coupling on the chip the multiple ring oscillators are not independent of one another; they potentially correlate in terms of frequency (which, if applicable, is harmless), but also in terms of phase, with the result that it may not be possible to achieve the desired quality of the random numbers that are generated.

It should be noted that the complexities of known circuits according to the existing art are very substantial. Either a structure for shifting the sampling point in time must be used, which structure can moreover also be susceptible to attacks and make the generated bits dependent on one another; or a very large number of sample values must be processed in parallel. Additional delay elements may also be necessary. An additional, slow ring oscillator is furthermore required.

It is necessary in any event to monitor the output of the random generator in order to be able to identify whether the random generator is in fact supplying random output values.

BRIEF SUMMARY OF THE INVENTION

The method that is presented allows an output of a random generator to be monitored, chronologically successive sample values at at least two sampling points being compared with one another. It is thereby possible to detect a relationship of those sample values with one another. It is thereby possible to detect a relationship of those sample values with one another, if it exists.

The method can be implemented in conjunction with a random generator that generates random numbers using a single ring oscillator. A slow ring oscillator for sampling, as known e.g. from the existing art, can be omitted in this case. Furthermore, no additional delay elements are required.

Successive sample values can be compared with one another in order to detect a relationship of those sample values with one another. It is possible in particular to output a warning if two sample values sensed directly after one another are identical, which means that all, for example all three, bits possess the same value. This need not mean that an error exists. An error is assumed only when a specific number of warnings is exceeded. If two successive sample values are not identical, however, the counter that stores the number of warnings is then reset. In a further embodiment it is not directly successive sample values, but instead the sample values in each case after a fixed number n of sampling actions, that are compared with one another. For this, the sample values are stored e.g. in a special memory, for example a FIFO (first-in first-out) memory, which has a depth n and which outputs the values n sampling actions ago after each n memory operation. It is thereby possible also to detect correlations between the oscillator frequency and the frequency of the sample clock that are not determined by an integral division ratio to one another.

The method presented furthermore makes possible on-line error detection and generation of a warning if the ring oscillator is not active or is correlated with the clock cycle of the sampling frequency. With monitoring of the warnings, after a specific number of warnings the frequency of the oscillator can be actively influenced, and/or after a further number of warnings an error message can also be outputted.

For monitoring, values at sampling points at one point in time can be compared with at least one predetermined pattern, for example (0, 0, 0) or (1, 1, 1). Upon detection of a predetermined pattern, a first warning signal can be generated. Alternatively or in supplementary fashion, a second warning signal can be generated and outputted in the context of a predetermined relationship between two sample values stored at different points in time. Activation of the second warning signal can be counted in a counter. Different actions can then be triggered when at least one threshold value is reached. With these actions, for example, the frequency of the ring oscillator can be modified.

The assemblage for carrying out the method encompasses a device that enables comparison of successive sample values, for example a comparator.

In an embodiment, the random generator encompasses a ring oscillator that is made up of a fed-back series circuit of multiple inverting elements and that oscillates at a first frequency. Sampling occurs synchronously with a sampling signal. The frequency of the sampling signal can be generated from a further signal that oscillates at a second frequency, or can be derived from the system clock, i.e. from a clock cycle that is used for further circuit elements, e.g. on the chip. The outputs of at least two of the inverting elements of the ring oscillator are stored as a multiple-bit sample value. At least two of these multiple-bit sample values from different sampling times are stored. From a comparison of the instantaneous multiple-bit sample value with another stored multiple-bit sample value, a first output signal is generated and is evaluated in an evaluation circuit.

The ring oscillator can have an odd number of inverting elements, picking off occurring at at least two sampling points, and those sample values from at least two sampling points, typically at at least two sampling points in time, being stored.

Provision can be made that the first output signal is generated when the two multiple-bit sample values are identical. Provision can further be made that the evaluation circuit is a counter, said counter being incremented at each activity of the first output signal, i.e. when the value of the output signal at a specific predetermined point in time is "high," and the counter is reset to a value of zero at each non-activity of the first output signal, i.e. when the value of the output signal at the aforesaid specific predetermined point in time is "low"; and as a function of one or more state values of the counter, output signals are generated which influence the frequency of the ring oscillator or indicate an error.

An error can moreover be indicated on a second output signal if at least one multiple-bit sample value corresponds to at least one predetermined bit pattern.

DETAILED DESCRIPTION OF THE INVENTION

Figure 1:
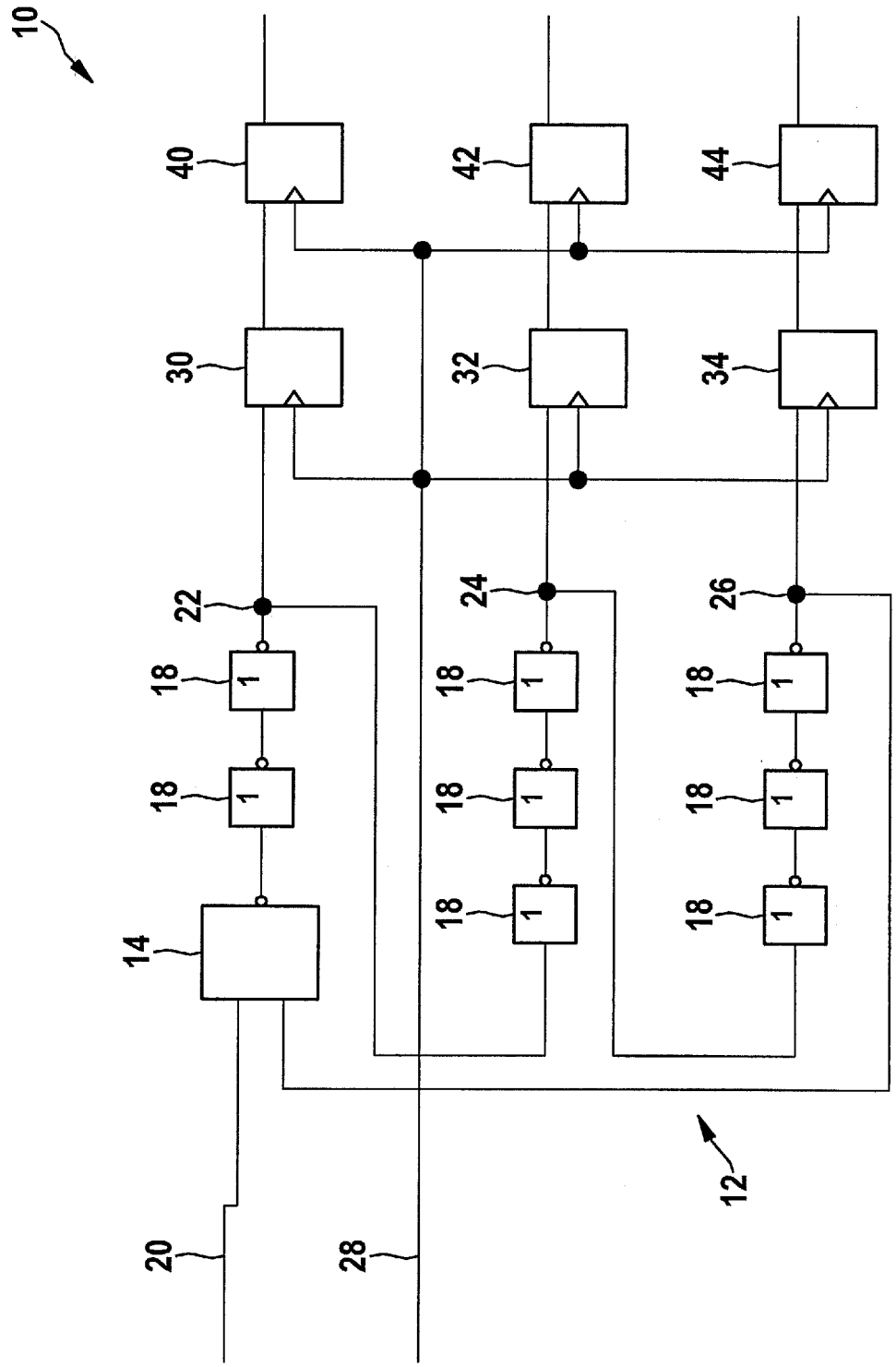
FIG. 1 shows an embodiment of a random generator.

The invention is depicted schematically in the drawings on the basis of exemplifying embodiments, and will be described in detail below with reference to the drawings.

FIG. 1 shows an embodiment of a random number generator that is labeled in its entirety with the reference number 10. This random generator 10 encompasses a ring oscillator 12 that has a NAND member 14 and eight inverters 18, and thus nine inverting elements. Ring oscillator 12 thus possesses an odd number of inverting elements.

Ring oscillator 12 can be started and stopped with a first input 20. The depiction further shows a first sampling point 22, a second sampling point 24, and a third sampling point 26. The sampling rate is predetermined via a second input 28. This means that beginning from first sampling point 22, a sampling action always occurs after an odd number of inverting elements. First sampling point 22 is sampled with a first flip-flop 30, the result being sample value s0. Second sampling point 24 is sampled with a second flip-flop 32, the result being sample value s1. Third sampling point 26 is sampled with a third flip-flop 34, the result being sample value s2. Associated with first flip-flop 30 is a further, fourth flip-flop 40. This latter performs a memory function and outputs the value s0' which precedes the value s0 in time, i.e. s0 and s0' are chronologically successive sample values of first sampling point 22. Correspondingly, second flip-flop 32 has associated with it a fifth flip-flop 42 that outputs s1', and third flip-flop 34 has associated with it a sixth flip-flop 44 that outputs s2'. An odd number of inverting elements is present in each case between two successive sampling points (22, 24, 26).

Ring oscillator 12 can thus in principle be constructed from, for example, nine inverters 14. One of these inverters 14 can be replaced by NAND element 14 in order to continue ring oscillator 12. Alternatively, this NAND element 14 can also be replaced by a NOR element.

In the embodiment shown, the values of ring oscillator 12 are stored isochronously at three different inverters, each in one flip-flop (FF) 30, 32, 34. These pickoffs are intended to be distributed as equally as possible over the elements of ring oscillator 12. For the case of nine inverting stages in ring oscillator 12, a pickoff or a sampling point 22, 24, 26 is therefore provided after each three inverting elements.

The number of inverter stages in ring oscillator 12 determines the frequency of the oscillator, and should therefore be selected so that the flip-flops can store the respective signal value. If the highest possible oscillator frequency is used, the probability of being in the vicinity of an edge upon sampling is higher. The number of inverters selected in the oscillator ring is therefore as small as possible, but still large enough that the flip-flops are capable of working for the frequency that is attained. For a 180-nm technology, a frequency of approx. 1 GHz for ring oscillator 12 having nine inverters 18 has been determined on a simulated basis. The flip-flops can store the signal values at this frequency, as has been demonstrated by simulation.

Storage of the sample values after each three inverter stages, with one inversion of the signal in each case, differs from the approaches according to the existing art, in which a delay of two inverter stages, i.e. without inversion of the delayed signal, is always required. In addition, successive sample values are not compared with one another therein.

The sample signal can be obtained from a clock signal by frequency division, the frequency division value being integral. The frequency division value and the number of inverting elements can furthermore possess common integral factors that are greater than 1.

Figure 2:
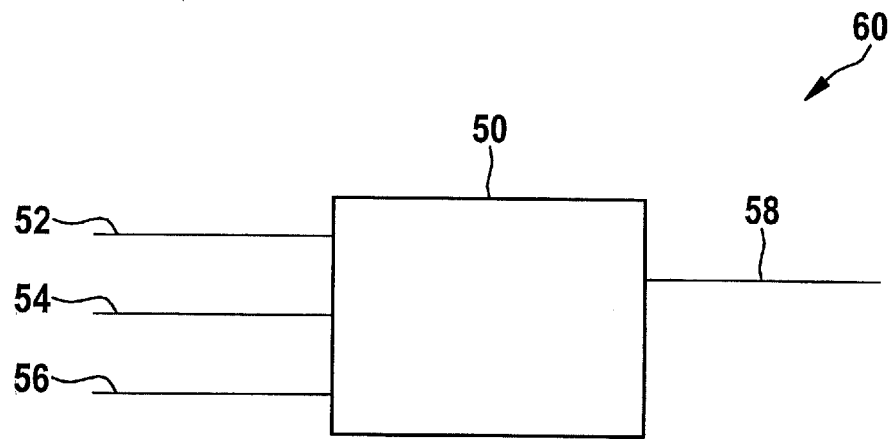
FIG. 2 shows a possibility for error detection.

FIG. 2 shows the possibility of identifying an error. The variables s0 52, s1 54, s2 56 enter a logic element 50. If s0=s1=s2, an error signal 58 is outputted.

It can be shown that only one signal at a time of these three outputs can contain a random value. It is furthermore practically impossible, in the absence of an error, for all three sample values s0, s1, s2 to have the same logical value. Logic element 50, which can also be referred to as a "checker" and represents a device 60 for comparing chronologically successive sample values with one another, checks whether signals s0=s1=s2, and then, if applicable, outputs the "error" signal 58, where "error"=(s0^s1^s2) v (/s0^/s1^/s2), where "^"=conjunction, "v"=disjunction, and "/"=inversion.

The "error" signal is, for example "1" if one of the three flip-flops having the outputs s0, s1, or s2 has an error. This error can be a permanent error due to a defect, or can have been brought about by an error attack. An error attack represents a deliberate influence on the TRNG that can be brought about, for example, by electric fields, alpha particles, neutrons, or by laser radiation. It is important to detect such attacks and react to them.

Figure 3:
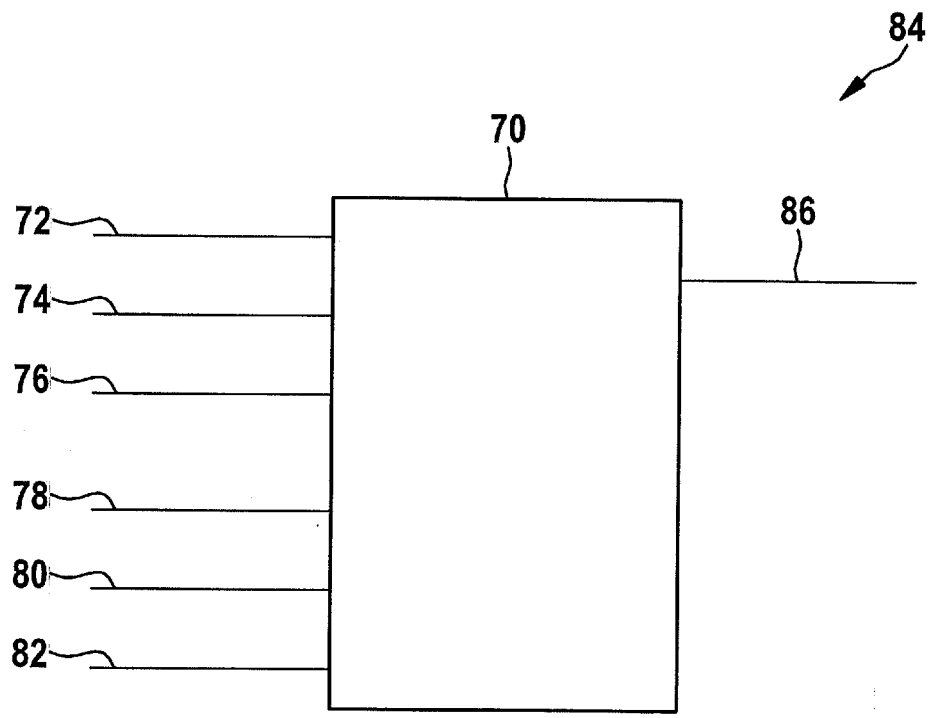
FIG. 3 shows a further possibility for error detection.

FIG. 3 shows a further possibility for error detection using a logic element 70 having the inputs s0 72, s1 74, s2 76, s0' 78, s1' 80, and s2' 82. A warning signal 86 can be outputted as an output. This possibility is also referred to as warning generator 84.

What is taken into consideration here is that in accordance with FIG. 1, each time a three-bit sample value s0, s1, and s2 is stored, the previous values are stored in three further FFs s0', s1', and s2'. A warning is generated in warning generator 84 if the three most recently stored bit values are identical to the three previously stored bit values:
"warning"=(s0≡s0')^(s1≡s1')^(s2≡s2'), where "^"=conjunction and "≡"=equivalence (XNOR).

A warning is outputted, for example, when the ring oscillator is not active, for example because the start signal=0 or the oscillator is not oscillating for other reasons.

A warning is also outputted when the oscillator frequency is, for example, an integral multiple of the sampling frequency. The oscillator is then always sampled in the same state. The correlation between the two frequencies can be random, can be caused by coupling effects between the oscillator frequency and the system clock (see discussion below), or can be the result of a deliberate influence (frequency injection attack). Such an attack, or the inadvertent coupling, must also be discovered and, if possible, prevented or counteracted. Actions for this are indicated. If exactly one bit in the three sampled bits is different, then, for example, at least one random value exists at that corresponding sample value, since sampling occurs in the vicinity of an edge.

A warning can, however, also be generated when the ratio of the oscillator frequency to the sampling frequency differs only slightly from an integral value. A warning can then be outputted repeatedly even though no correlation exists between the two frequencies. A presumption of correlation between these two frequencies is therefore probable only when a warning has been outputted repeatedly in succession, typically in excess of a predetermined number.

A correlation between oscillator frequency and sampling frequency can have serious consequences. For example, if the sampling frequency was produced from the system clock by integral division, and if the system clock is used on the chip for switching operations, such a switching operation can generate periodic substrate currents that can influence the oscillator frequency. In the worst case the ring oscillator correlates with the system clock, with the result that all noise effects, i.e. jitter and therefore randomness, can be lost. It is therefore important to count the warnings in an event counter according to FIG. 4.

Figure 4:
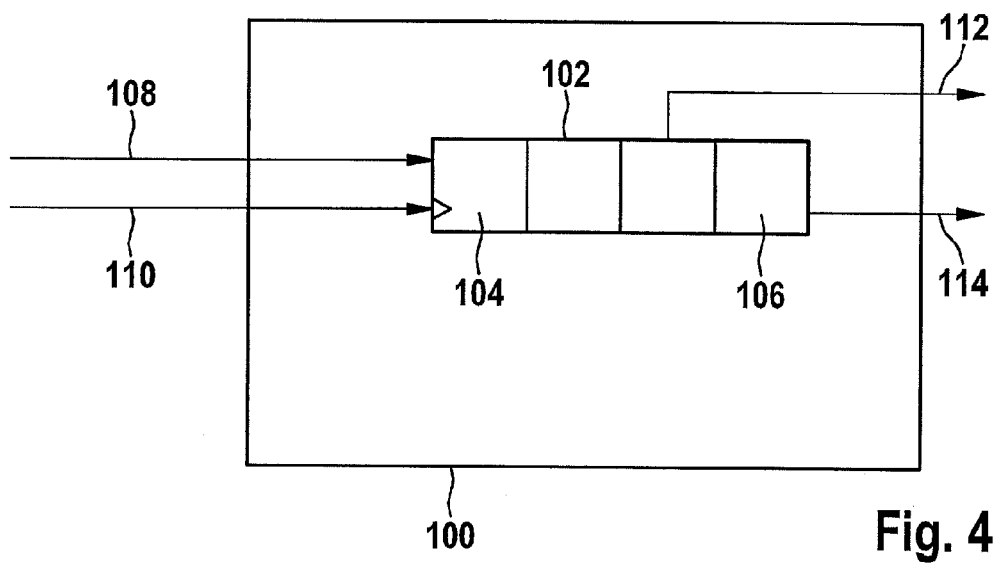
FIG. 4 shows an event counter.

FIG. 4 shows a so-called event counter 100 that encompasses a register 102 in which bits are stored. In the depiction, LSB 104 and MSB 106 are indicated. A first input 108 inputs the warning signal; a second input 110 inputs a sample clock sample_clock_dly. The sample clock used here is a clock that is obtained from sample_clock by delaying, for example by an amount equal to one system clock cycle. This is depicted in further detail in FIG. 8.

A first output 112 outputs a signal that can be used to modify the oscillator frequency once a first threshold value of the number of successive warnings is reached. A second output 114 outputs an error signal that is generated when the number of successive warnings exceeds a second threshold value.

Event counter 100 is reset at a value "warning=0," and incremented at "warning=1." If event counter 100 reaches, for example, a value of 16, and thus a second threshold value, an error signal is then outputted. It is furthermore proposed that, for example, the frequency of the oscillator is already influenced at a value of 8 (a first threshold value) of event counter 100, in order to avoid a possible correlation. Such an influence on the frequency of the oscillator can be effected, for example, by switching in or out additional capacitances at at least one inverter of the ring oscillator, or by varying the supply voltage of the ring oscillator. This type of variation of the supply voltage can be accomplished, for example, by switching on, switching off, or generally varying a resistor in the supply voltage lead of the ring oscillator.

Figure 5:
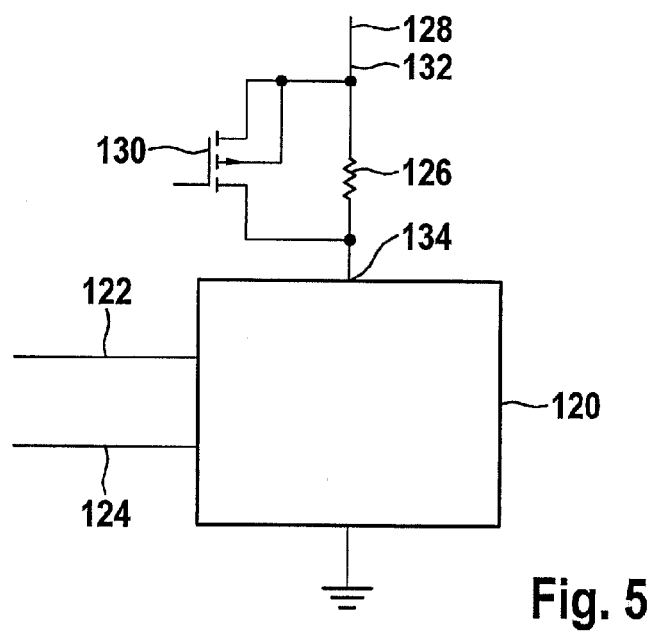
FIG. 5 shows a ring oscillator with power supply.

FIG. 5 shows this possibility, the switch being embodied as a p-channel transistor. The depiction shows a ring oscillator 120 having a first input 122 for starting and a second input 124 for the sample clock. A resistor 126 in a power supply lead 128 can be bypassed using a p-channel transistor 130. A general power supply 132, and a power supply 134 of ring oscillator 120, are therefore present. The depiction illustrates the possibility of influencing the oscillator frequency by way of the bypassed resistor 126 in supply lead 128 of ring oscillator 120, in this case switched through p-channel transistor 130. Any other switch is, however, also possible. Also conceivable are multiple switches for different first threshold values.

If the result of this action is the warning "warning=0," the event counter is reset. In the contrary case, the event counter is further incremented until an error is outputted. The error can prevent the TRNG from continuing to output values, or can in fact stop the oscillator. Multiple event-counter values, at which different actions may be taken, are conceivable.

In many standard approaches according to the existing art, an attempt is made to counteract a correlation between the oscillator frequency and sampling frequency by the fact that the sampling frequency is generated by a further ring oscillator, typically at a lower frequency. It is not thereby possible, however, to prevent both the fast ring oscillator and the slow ring oscillator from correlating with the system clock. The slow ring oscillator can therefore be omitted. The sample clock can therefore also be obtained from the system clock, using a frequency divider, if a correlation can be identified and can be influenced, for example by modifying the oscillator frequency. The frequency divider according to FIG. 6, for obtaining the sample clock from the system clock, should have for that purpose at least one integral division value. Direct correlations of the system clock can then be discovered at the same oscillator inverter stages using the method described above.

Also possible, however, is a correlation in which one system clock edge influences a first inverter stage, and a further same-direction system clock edge influences a second inverter stage. This can occur, for example, because the system clock acts e.g. via substrate currents on the entire oscillator, but only those inverters at which a change in state is currently occurring are particularly sensitive to coupling effects. It may therefore happen that the above-described position of the second inverter is disposed with an offset of two inverters from the first inverter stage. A further same-direction system clock edge can then influence a third inverter stage that is offset four positions from the first inverter stage, and so forth. The correlating frequency could then deviate by 2/9, 4/9, etc. from the oscillator frequency. Every ninth same-direction system edge would then again influence the same position in the oscillator. The system clock would then influence exactly the same position in the oscillator for every ninth sample value (s0, s1, and s2). Every ninth sampling action would then therefore again be referred to the same condition in the oscillator, i.e. the same signal levels would be present in the oscillator, and thus the same sample values (s0, s1, and s2) would be present, if sampling were performed using the system clock or an integrally divided system clock (see FIG. 5).

If the division value of the frequency divider is a multiple of 9, however, then in this case as well, warnings can already be generated between two successive sample values. The same method for detecting correlations can therefore be used for this instance as well. It is therefore very useful if a multiple of 9, or a multiple of the number of inverting elements in the ring oscillator, is selected for the division ratio.

Figure 6:
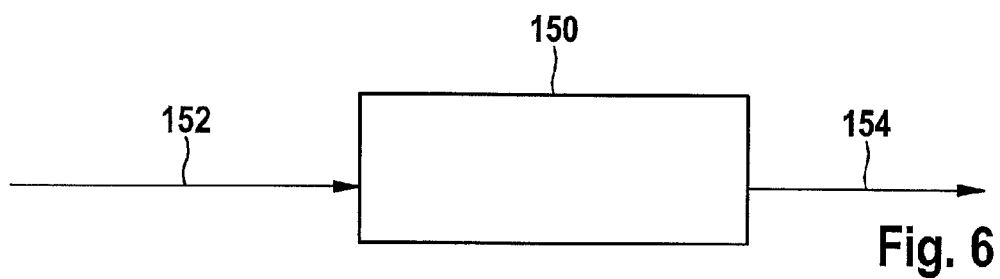
FIG. 6 shows a frequency divider.

This eliminates the need to store a large number of sample values for the detection of correlations; this is illustrated in FIG. 6. FIG. 6 shows a frequency divider 150 having an input 152 for the system clock or for the so-called "slow" oscillator clock, and an output 154 for the sample clock, where n=number of inversions in the fast oscillator and m=number of inversions in the slow oscillator. "LCM" refers to the least common multiple. The relationship is:

Division ratio: $i*n$ or $i*LCM(n,m)$

Consideration can be limited to storage two times, as in FIG. 1, and warnings can thus also be generated in the above-described cases in accordance with FIG. 3.

In a further conceivable case, one edge of the system clock could influence a first inverter stage, and an oppositely directed edge of the system clock could influence a second inverter stage that is disposed in the ring oscillator with an offset of only one position from the first inverter stage. If the working cycle of the system clock is 50%, i.e. the low phase and high phase of the system clock are of equal length, a correlation can be caused by this as well: a positive edge influences the first inverter of the ring oscillator, and a negative edge of the system clock influences the next inverter. After every nine same-direction edges, or a total of 18 edges, however, here as well the same situation is arrived at as at the beginning. If the division value of the frequency divider corresponds to a multiple of 9, however, here again the correlation is detected using the same method according to FIG. 3. An implementation of the frequency divider is proposed in FIG. 6.

Figure 7:
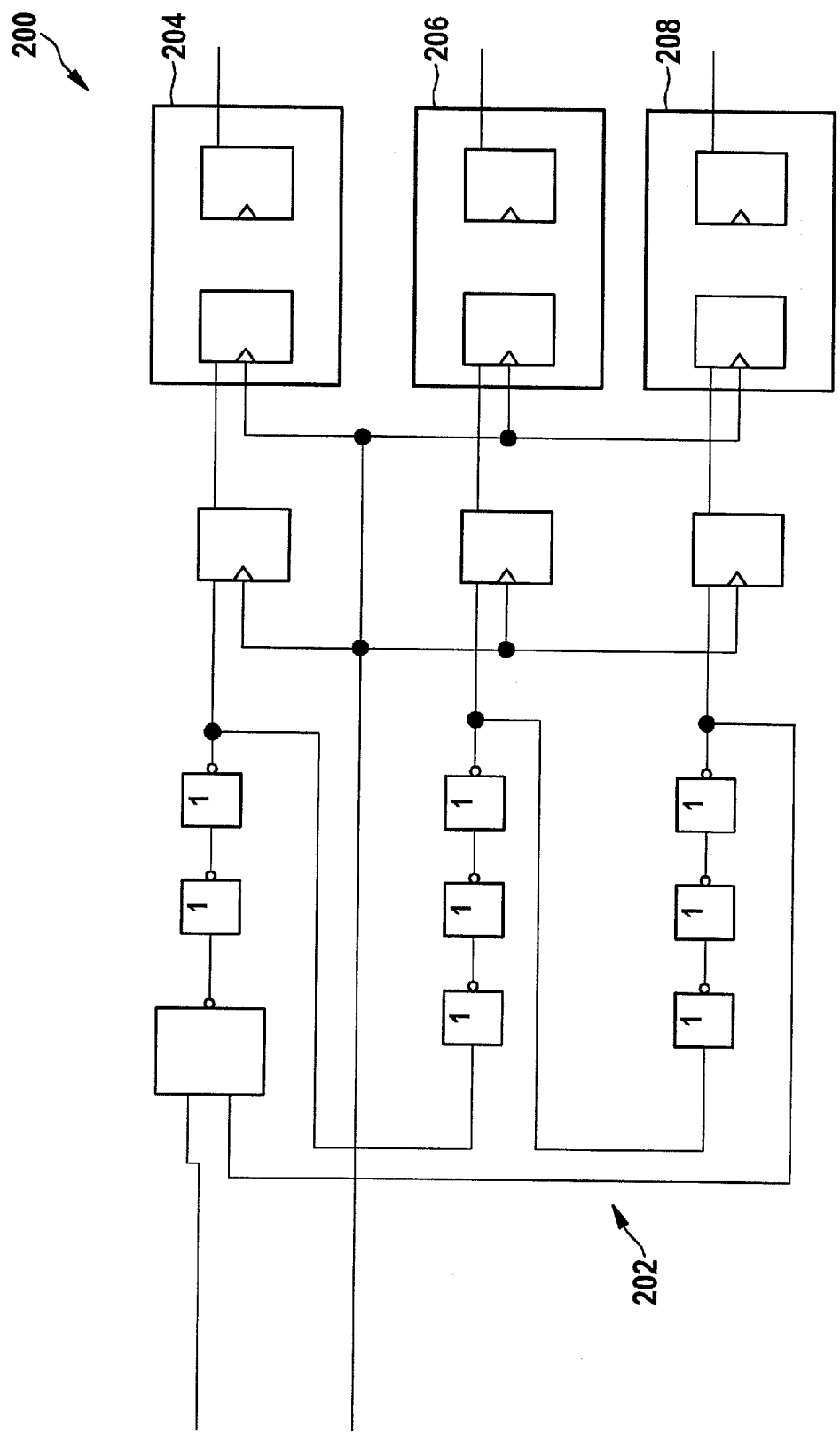
FIG. 7 shows a further assemblage for carrying out the method described.

FIG. 7 shows a random generator 200 having a ring oscillator 202 having FIFOs 204, 206, and 208, when the clock divider cannot be selected, in accordance with FIG. 6, to have a division ratio equal to a multiple of 9 or to the number of inverting elements in ring oscillator 12 in FIG. 1. In this case it is necessary for more than just two sample values to be stored, and for every ninth sample value always to be compared with one another. A FIFO (first-in first-out memory) having a depth of 9 is used for this purpose. This memory has the property that whenever a memory value is stored, output of the value nine storage events earlier occurs. If this value outputted from the FIFO is compared with the instantaneous sample value, it is thus possible to generate a warning (as described previously) according to FIG. 3 if the output values of FIFOs 204, 206, and 208 according to FIG. 7 are used instead of the sample values according to FIG. 1.

In a further embodiment of the example shown, the depth d of the FIFO and a division value w of the clock divider can also be used in such a way that w*d corresponds to the number of inverting elements, and the division ratio of the clock divider according to FIG. 6 is divisible by w.

Figure 8:
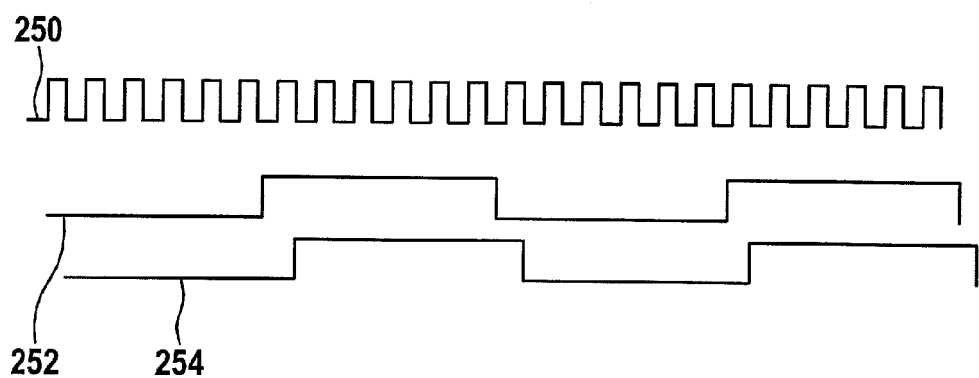
FIG. 8 shows profiles of sample clocks.

FIG. 8 shows profiles of clock cycles, namely a system clock 250, a sample clock (sample_clock) 252, and a delayed sample clock (sample_clock_dly) 254. FIG. 8 thus illustrates examples of properties of sample_clock_dly with reference to the sample clock and system clock. The delayed sample clock can be obtained from the sample clock, for example, by feeding the sample clock into a flip-flop that is timed using the system clock.

The following general considerations apply: The instantaneous values of the ring oscillator should preferably be stored simultaneously in the flip-flops at at least three locations. The positions of the corresponding inverters of the ring oscillator at which sampling occurs should be distributed as uniformly as possible over the ring oscillator; and if possible, an odd number of inverting stages should be located between two adjacent sampling positions. The sampled values are compared with predetermined patterns, for example (0, 0, 0) or (1, 1, 1). In a further embodiment, sampling can also occur after each inverting element. In an embodiment, sampling of the ring oscillator occurs at a frequency that is obtained from the system clock by frequency division, and the division ratio used as a basis corresponds to an integer that is a multiple of the number of inverter stages (including the NAND) of the oscillator.

Alternatively, the sample clock can also be generated from a slow ring oscillator by frequency division. The division ratio should be integral, and should be a multiple of the lowest common multiple (LCM) of the number of inverting stages in the fast and in the slow oscillator. If such a division ratio is not possible, for example because it is too large, a smaller division ratio can also be selected. In order to discover the above-described correlations at various positions, the data must be buffered, e.g. in a first-in first-out memory, as described above.

A factor x not considered in the division ratio then indicates that every x-th sample should be compared with one another in order to discover all the above-described correlations. The FIFO should then possess a depth of x memory elements, i.e. an input value into the FIFO appears at the output of the FIFO after x clock cycles.

What is claimed is:

1. A method for monitoring an output of a random generator, comprising:

sampling chronologically successive output values at each one of at least two sampling points of the random generator;
wherein the random generator includes a ring oscillator which has an odd number of inverting elements;
wherein the sampled chronologically successive output values are stored;
wherein an odd number of inverting elements is present in each case in the ring oscillator between at least two directly successive sampling points; and
comparing the sampled chronologically successive output values with one another in order to detect a relationship of the sampled values with one another.

2. The method as recited in claim 1, wherein sample values at the sampling points at one point in time are compared with at least one predetermined pattern.

3. The method as recited in claim 2, wherein a first warning signal is generated upon detection of the at least one predetermined pattern in the sample values.

4. The method as recited in claim 3, wherein a second warning signal is outputted if a predetermined relationship between two sample values stored at different points in time is detected.

5. The method as recited in claim 4, wherein each occurrence of the second warning signal is counted in a counter, and at least one action is triggered when at least one threshold value of said counter is reached, and wherein the counter is reset when the second warning signal is not active.

6. The method as recited in claim 5, wherein the at least one action, which is triggered when the at least one threshold value of said counter is reached, is modification of a frequency of the ring oscillator.

7. The method as recited in claim 4, wherein sampling occurs synchronously at all sampling points of the random generator, synchronous with at least one sampling signal.

8. The method as recited in claim 7, wherein the at least one sampling signal is obtained from a clock signal by frequency division, and where a frequency division value is integral.

9. The method as recited in claim 8, wherein the frequency division value and the number of inverting elements in the ring oscillator possess common integral factors which are greater than 1.

10. The method as recited in claim 8, wherein the frequency division value is divisible by the number of inverting elements in the ring oscillator.

11. A system for monitoring an output of a random generator, comprising:
a sampling arrangement configured to sample chronologically successive output values at each one of at least two sampling points of the random generator;
wherein the random generator includes a ring oscillator which has an odd number of inverting elements;
wherein the sampled chronologically successive output values are stored;
wherein an odd number of inverting elements is present in each case in the ring oscillator between at least two directly successive sampling points; and
a comparison device configured to compare the sampled chronologically successive output values with one another in order to detect a relationship of the sampled values with one another, the sampled values each having at least two bits.

12. The system as recited in claim 11, wherein the comparison device is configured to compare the sampled values at the sampling points with at least one predetermined pattern.

13. The system as recited in claim 12, further comprising:
an event counter, wherein the event counter counts each occurrence of a warning signal which is outputted when a predetermined relationship between two sample values stored at different points in time is detected.

* * * * *